US008780371B2

(12) United States Patent
Aoki et al.

(10) Patent No.: US 8,780,371 B2
(45) Date of Patent: Jul. 15, 2014

(54) PRINTING APPARATUS, COMPUTER USABLE MEDIUM, AND CONTROLLING METHOD THEREFOR

(75) Inventors: Kazuma Aoki, Aichi (JP); Masashi Kato, Aichi (JP); Toru Tsuzuki, Aichi (JP); Hiroyuki Yamamoto, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1167 days.

(21) Appl. No.: 11/758,832

(22) Filed: Jun. 6, 2007

(65) Prior Publication Data

US 2007/0279689 A1  Dec. 6, 2007

(30) Foreign Application Priority Data

Jun. 6, 2006  (JP) .................................. 2006-157751

(51) Int. Cl.
*G06K 15/00* (2006.01)

(52) U.S. Cl.
USPC .......... 358/1.14; 358/1.15; 358/1.16; 710/15; 710/19; 710/23; 710/28

(58) Field of Classification Search
USPC ........ 710/15, 19, 23, 28; 358/1.14, 1.15, 1.16
See application file for complete search history.

(56) References Cited

U.S. PATENT DOCUMENTS

| | | | | |
|---|---|---|---|---|
| 5,652,830 | A * | 7/1997 | Yamamoto et al. | 358/1.16 |
| 6,198,541 | B1 * | 3/2001 | Okimoto | 358/1.14 |
| 6,202,092 | B1 | 3/2001 | Takimoto | |
| 6,372,974 | B1 * | 4/2002 | Gross et al. | 84/609 |
| 6,978,112 | B2 * | 12/2005 | Kaburagi et al. | 399/366 |
| 7,423,776 | B2 * | 9/2008 | Murata | 358/1.16 |
| 7,612,900 | B2 * | 11/2009 | Kanai | 358/1.14 |
| 8,018,608 | B2 * | 9/2011 | Nishimura | 358/1.14 |
| 8,378,824 | B2 * | 2/2013 | Ohmiya | 340/572.1 |
| 2002/0135816 | A1 * | 9/2002 | Ohwa | 358/474 |
| 2003/0090695 | A1 | 5/2003 | Murata | |
| 2005/0111034 | A1 * | 5/2005 | Karasaki et al. | 358/1.15 |
| 2006/0085567 | A1 | 4/2006 | Takada | |
| 2006/0242259 | A1 * | 10/2006 | Vallabh et al. | 709/217 |

FOREIGN PATENT DOCUMENTS

| | | |
|---|---|---|
| JP | 9030057 | 2/1997 |
| JP | 10161823 | 6/1998 |
| JP | 2003-186642 A | 7/2003 |
| JP | 2005339383 | 12/2005 |
| JP | 2006-110860 A | 4/2006 |
| JP | 3929396 B2 | 6/2007 |

OTHER PUBLICATIONS

JP Office Action dtd Apr. 1, 2008, JP Appln. 2006-157751.

* cited by examiner

*Primary Examiner* — Mark Zimmerman
*Assistant Examiner* — Lawrence Wills
(74) *Attorney, Agent, or Firm* — Banner & Witcoff, Ltd.

(57) ABSTRACT

A printing apparatus to make a number of copies of a printed material on which an image is formed according to print data stored in a removable memory medium is provided. The printing apparatus includes an interface to which the removable memory medium is connected so that the print data stored in the removable memory medium is inputted to the printing apparatus, a printable number detecting system, which is configured to detect a number of copies of the printed material to be made being stored in the removable memory medium, a printing system, which is configured to make the printed material, and a controlling system, which is configured to control a total of the number of copies of the printed material to be made by the printing system.

16 Claims, 13 Drawing Sheets

FIG.4A
FILE SPECIFYING SCREEN
PLEASE SELECT A FILE TO PRINT
sample1. dat
FIG.4B
COPY NUMBER SPECIFYING SCREEN
PLEASE INPUT A NUMBER OF COPIES TO BE MADE
1
FIG.4C
REPRINT DATA SPECIFYING SCREEN
PLEASE SELECT DATA TO BE REPRINTED
20xx/xx/xx hh:mm:ss
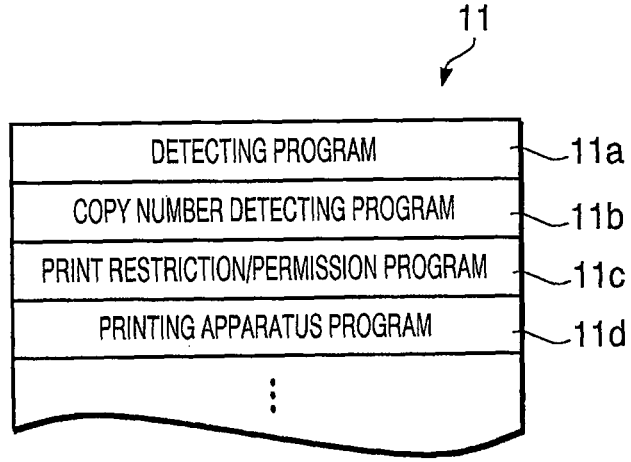
DETECTING PROGRAM — 11a
COPY NUMBER DETECTING PROGRAM — 11b
PRINT RESTRICTION/PERMISSION PROGRAM — 11c
PRINTING APPARATUS PROGRAM — 11d
FIG. 5

PRINTING APPARATUS, COMPUTER USABLE MEDIUM, AND CONTROLLING METHOD THEREFOR

CROSS REFERENCE TO RELATED APPLICATION

This application claims priority from Japanese Patent Application No. 2006-157751 filed on Jun. 6, 2006, the entire subject matter of which is incorporated herein by reference.

BACKGROUND

1. Technical Field

Aspects of the present invention relate to a printing apparatus, and more specifically, a printing apparatus capable of printing print data stored in a removable storage medium and a computer usable medium to control a number of copies to be printed by the printing apparatus.

2. Related Art

Conventionally, a printing apparatus capable of printing an image according to print data stored in a removable storage medium such as a USB (universal serial bus) memory, which is inserted into a USB interface of the printing apparatus, is known. In such a printing apparatus, the print data can be printed directly as the USB memory having the print data is inserted into the USB interface, and no user instruction is required.

As the USB memory is not required to be connected to a PC (personal computer) in order to obtain the print data to print, in case that additional copies of a printed material are urgently required during a meeting, for example, the user can obtain the copies promptly and easily by inserting the USB memory into the USB interface of a nearest printing apparatus if the user has the print data prepared in the USB memory.

SUMMARY

Aspects of the present invention are advantageous in that a printing apparatus and a computer usable medium therefore to control the same are provided, wherein the printing apparatus is capable of avoiding leaks of information included in data stored in a removable storage medium, and wherein a number of copies to be printed by using the data are restricted.

BRIEF DESCRIPTION OF THE ACCOMPANYING DRAWINGS

FIGS. 4A-4C are illustrative views of screens shown in a display unit 14 of the printing apparatus 1 according to the embodiments of the invention.

FIG. 5 is a schematic diagram illustrating a data configuration in a ROM (read only memory) 11 in the printing apparatus 1 according to the first embodiment of the invention.

DETAILED DESCRIPTION

General Overview

Figure 1:
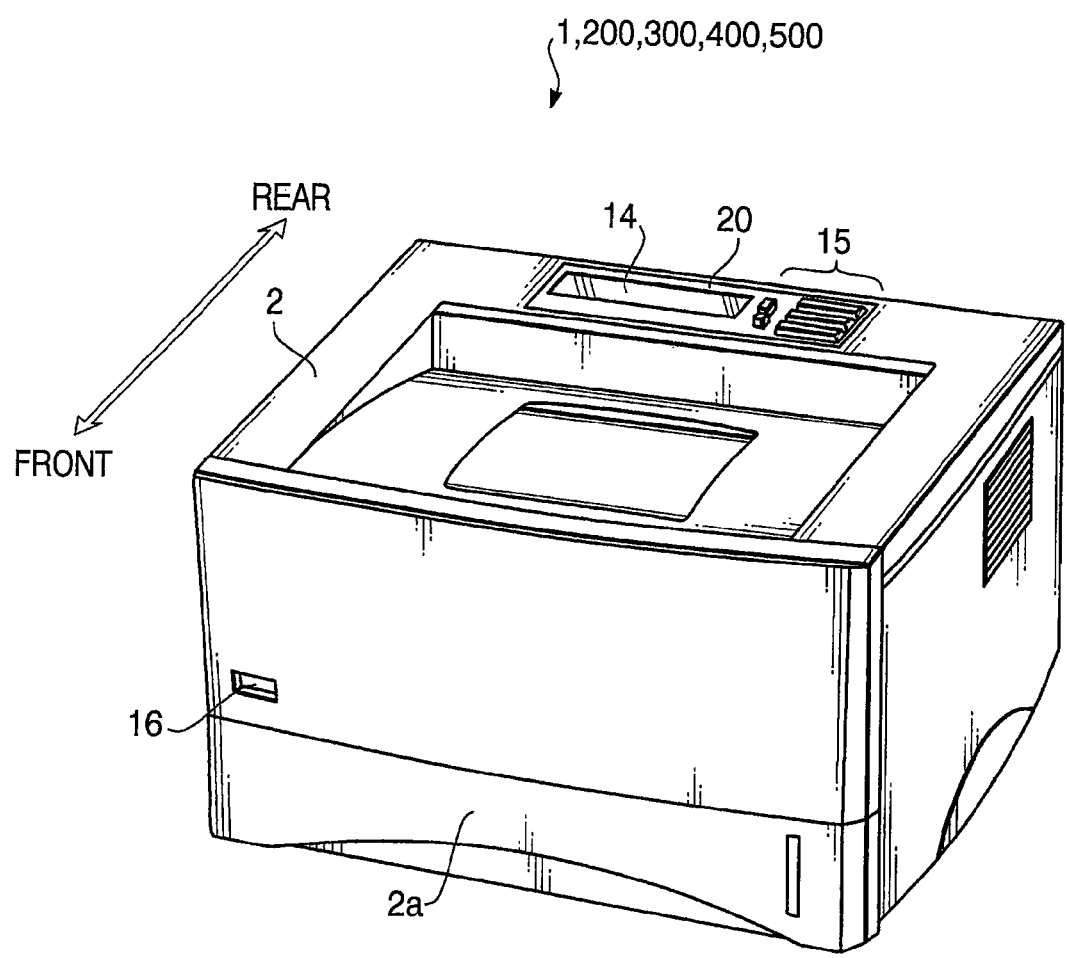
FIG. 1 is a perspective view of an overall configuration of a printing apparatus 1 according to a first embodiment of the invention.

According to an aspect of the present invention, there is provided a printing apparatus to make a number of copies of a printed material on which an image is formed according to print data stored in a removable memory medium. The printing apparatus includes an interface to which the removable memory medium is connected so that the print data stored in the removable memory medium is inputted to the printing apparatus, a printable number detecting system, which is configured to detect a number of copies of the printed material to be made being stored in the removable memory medium, a printing system, which is configured to make the printed material, and a controlling system, which is configured to control a total of the number of copies of the printed material to be made by the printing system.

Optionally, the printable number detecting system may detect a maximum printable number of copies of the printed material to be made. The maximum printable number may be associated with the print data and stored in the removable memory medium. The printing system may make a specified printable number of copies of the printed material. The specified printable number may be specified by a user.

Optionally, the printable number detecting system may detect a maximum printable number of copies of the printed material to be made. The maximum printable number may be associated with the print data and stored in the removable memory medium. The printing system may make a specified printable number of copies of the printed material. The specified printable number may be specified by a user. The controlling system may control a total of the specified printable number to be restricted to be within the maximum printable number.

According to the above configuration, a maximum number of the printed material to be made can be specified. Therefore, it can be avoided that an unnecessary and unauthorized number of copies of the printed material are made so that information contained in the print data can be prevented from undesirable leaks.

Optionally, the specified printable number may be specified to be equal to the maximum printable number if no instruction is given to the printing apparatus from the user.

With the above configuration, the user is not bothered by a remaining printable number of copies to be made, and the maximum printable number of copies can be made in a simple operation.

Optionally, the print data stored in the removable memory medium may be configured to be inaccessible when the total of the specified printable number reaches to the maximum printable number.

Optionally, the print data stored in the removable memory medium may be deleted therefrom when the total of the specified printable number reaches to the maximum printable number.

Optionally, the print data stored in the removable memory medium may be configured to be inaccessible when the total of the specified printable number of copies of the printed material being made reaches to the maximum printable number.

With the above configuration, it can be avoided that the print data is obtained by an unauthorized user after making the maximum printable number of copies so that the information contained in the print data can be prevented from undesirable leaks.

Optionally, the print data stored in the removable memory medium may be configured to be deleted therefrom before the total of the specified printable number reaches to the maximum printable number.

With the above configuration, the print data stored in the removable memory medium is deleted therefrom even when the removable memory medium is removed from the interface of the printing apparatus before the total of the specified printable number reaches to the maximum printable number so that the information contained in the print data can be prevented from undesirable leaks.

Optionally, the printed material may be made when the print data stored in the removable memory medium succeeds in being deleted therefrom before the total of the specified printable number reaches to the maximum printable number.

Optionally, the printed material may not be made when the print data stored in the removable memory medium failed to be deleted therefrom before the total of the specified printable number reaches to the maximum printable number.

With the above configuration, when the print data succeeds to be deleted from the removable memory medium, it is considered that the removable memory medium is not removed from the interface of the printing apparatus. Thus, the specified printable number of printed material is made. Meanwhile, when the print data fails to be deleted from the removable memory medium, it can be considered that the removable memory medium has been undesirably removed. Therefore, the printed material is to be made so that the information in the printed material is not exposed and can be prevented from undesirable leaks. It is noted that the printed material is not made both when making the specified printable number of the printed material is not initiated at all and when making the specified printable number of the printed material is initiated but ceased. Thus, the information contained in the print data can be prevented from undesirable leaks.

Optionally, a remaining printable number, which indicates a remaining number of copies of the printed material allowed to be made, may be obtained by subtracting a number of copies of the printed material made from the maximum printable number and may be stored so that the total of the copies of the printed material to be made is restricted to be within the maximum printable number.

With the above configuration, the total of the specified printable number can be restricted to be within the maximum printable number when the printed materials are made in a plurality of number of printing operations Optionally, the printing apparatus may further comprise a record generating system, which is configured to generate a record corresponding to the print data, and a record storing system, which is configured to store the record of the print data generated by the record generating system. The specified printable number within the maximum printable number of copies of the printed material may be made, and the record corresponding to the print data generated by the record generating system may be stored in the record storing system when no record corresponding to the print data is present in the record storing system.

Optionally, a remaining printable number, which indicates a remaining number of copies of the printed material allowed to be made, may be obtained by subtracting a number of copies of the printed material made from the maximum printable number and is stored so that the total of the copies of the printed material to be made is restricted to be within the maximum printable number. The record corresponding to the print data may indicate that the print data has been used to make the printed material and the remaining printable number of the printed material according to the print data.

With the above configuration, the total of the specified printable number of the printed materials to be made can be restricted to be within the maximum printable number when the printed materials are made in the printing apparatus having the record corresponding to the print data.

Optionally, the specified printable number of copies of the printed material may be made when the record corresponding to the print data is present in the record storing system and the remaining printable number is greater than zero and smaller than the maximum printable number. The remaining printable number may be decremented by one.

With the above configuration, the number of the printed material to be made can be maintained within the maximum printable number so that the information contained in the print data can be prevented from undesirable leaks.

Optionally, the total of the specified printable number may be restricted to be within the maximum printable number when printable number restricting information corresponding to the print data is included in the removable memory medium. Restriction to the total of the specified printable number may be removed when the printable number restricting information corresponding to the print data is not included in the removable memory medium.

With the above configuration, when the printable number restricting information is not detected, the restriction to the total of the specified printable number can be removed so that the number of the printed material can be unlimited.

Optionally, the specified printable number may be specified to be one if no instruction is given to the printing apparatus from the user.

With the above configuration, when the specified printable number is not given, a minimum number of copies of the printed material can be obtained.

Optionally, the printing apparatus may further comprise a print data storage, in which the print data having been used in the printing apparatus is stored, and a print data storing system, which is configured to record the print data having been used in the printing apparatus in the print data storage. The print data storing system may be disabled when printable number restricting information corresponding to the print data is included in the removable memory medium.

With the above configuration, storing the print data in the print data storage can be prevented, and making a copy of the printed material according to the print data stored in the print data storage can be prevented the information contained in the print data can be prevented from undesirable leaks.

According to an aspect of the invention, there is provide a computer usable medium comprising computer readable instructions for controlling a computer to make a number of copies of a printed material on which an image is formed according to print data stored in a removable memory medium, having an interface to which the removable memory medium is connected so that the print data stored in the removable memory medium is inputted to the computer, by executing steps of detecting a maximum printable number of copies of the printed material to be made, the maximum printable number being associated with the print data and stored in the removable memory medium, making a specified printable number of copies of the printed material, and controlling a total of the specified printable number to be restricted to be within the maximum printable number.

According to an aspect of the invention, there is provided a method to control a printing apparatus, which is capable of making a number of copies of a printed material on which an image is formed according to print data stored in a removable memory medium, by executing steps of detecting a maximum printable number of copies of the printed material to be made, the maximum printable number being associated with the print data and stored in the removable memory medium making a specified printable number of copies of the printed material, and controlling a total of the specified printable number to be restricted to be within the maximum printable number.

With the above configuration, it can be avoided that an unnecessary and unauthorized number of copies of the printed material are made so that information contained in the print data can be prevented from undesirable leaks.

Embodiments

First Embodiment

Hereinafter, referring to accompanying drawings, a first embodiment of the present invention will be described. FIG. 1 is a perspective view of an overall configuration of a printing apparatus 1 according to the first embodiment of the invention. The printing apparatus 1 includes a chassis 2, and at a bottom portion of the chassis 2 is provided with a sheet tray 2a, in which a stack of recording sheets are stored. The sheet tray 2a is detachably attached to the chassis 2 and can be detached from the chassis 2 by being pulled toward front of the printing apparatus 1.

On a rear portion of a top surface of the printing apparatus 1, an operation panel 20 having a display unit 14 and an operation unit 15 (see FIG. 3) is provided. A front surface of the printing apparatus 1 is provided with a USB host I/F (interface) 16 to which a USB memory 3 (see FIG. 2) being a removable storage medium can be attached.

Figure 2:
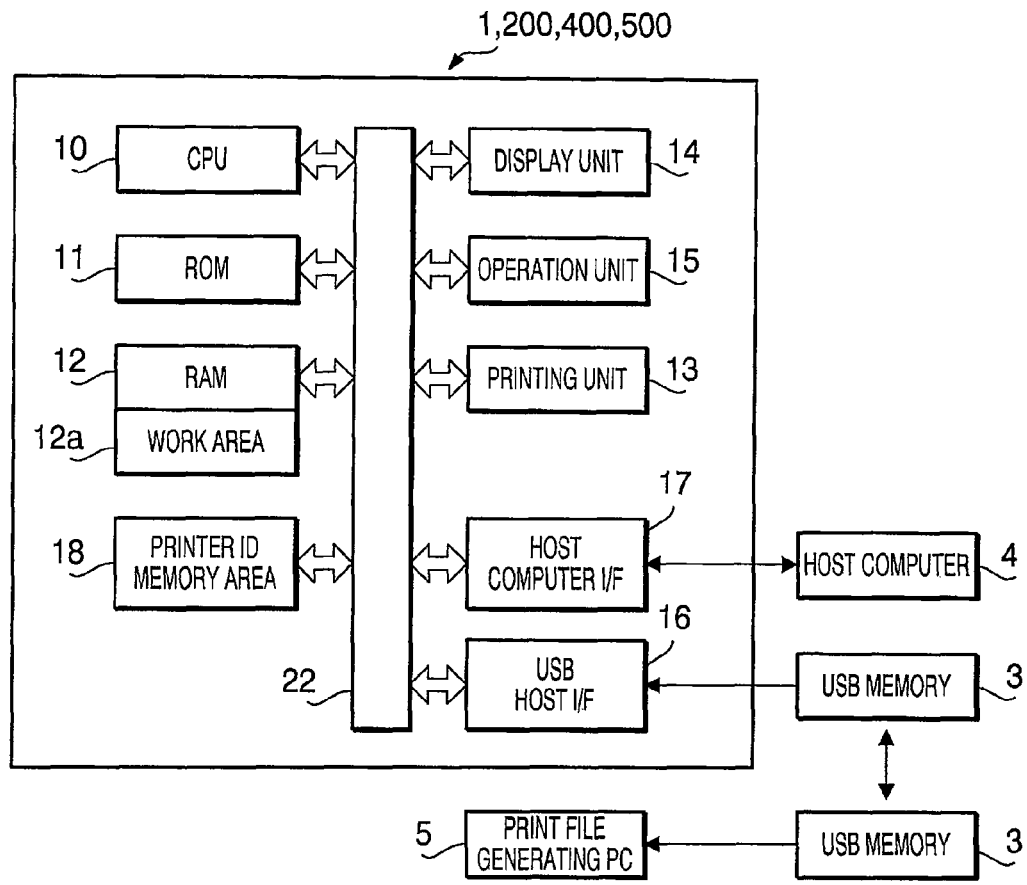
FIG. 2 is a block diagram of an electrical configuration of the printing apparatus 1 according to the first embodiment of the invention.

FIG. 2 is a block diagram of an electrical configuration of the printing apparatus 1 according to the first embodiment of the invention. The printing apparatus 1 is provided with a CPU (central processing unit) 10, a ROM (read only memory) 11, a RAM (random access memory) 12, a printing unit 13, the display unit 14, the operation unit 15, the USB host I/F 16, a host computer I/F 17, and a printer ID memory area 18. The CPU 10 controls the entire printing apparatus. The ROM 11 stores various programs and data to operate the printing apparatus 1. The RAM 12 is loaded various programs and data used by the CPU 10. The printing unit 13 is a mechanism to form an image according to print data in a printing method such as a laser beam printing method and an inkjet printing method. The display unit 14 includes a displaying mechanism such as an LCD (liquid crystal display). The operation unit 15 includes various operation buttons to be operated by the user. The host computer I/F 17 serves as an interface to connect the printing apparatus 1 with an external device such as a host computer 4. The printer ID memory area 18 is configured with a nonvolatile memory such as a flash ROM and stores data such as a printer ID (identification). The RAM 12 includes a work memory 12a as a work area for the CPU 10 to execute various programs. It is noted that in FIG. 2 the USB memory 3 can be also detachably attached to a PC (personal computer) for generating a print file (hereinafter referred to as a print file generating PC 5).

Figure 3:
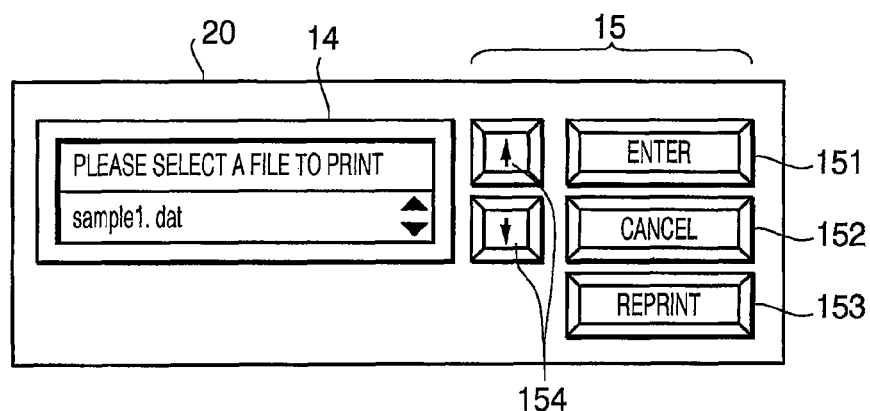
FIG. 3 is an illustrative view of an operation panel 20 of the printing apparatus 1 according to the first embodiment of the invention.

FIG. 3 is an illustrative view of an operation panel 20 of the printing apparatus 1 according to the first embodiment of the invention. The operation panel 20 is integrally configured with the display unit 14 and the operation unit 15 having an enter button 151, a cancel button 152, a reprint button 153, and up and down direction buttons 154. The enter button 151 is operated when a content of a selected file is printed by the printing unit 13. The cancel button 152 is operated when a running process is ceased. The reprint button 153 is operated when print data stored in the RAM 12 is used to be reprinted. Each of the up and down direction buttons 154 is operated when an item to be selected shown in the display unit 14 is switched to another item.

FIGS. 4A-4C are illustrative views of screens shown in the display unit 14 of the printing apparatus 1 according to the first embodiment of the invention. FIG. 4A shows a file specifying screen, wherein a file including print data to be printed is specified by the user operating the up and down direction buttons 154. Description of FIG. 4B will be provided later together with description of a second embodiment of the present invention. FIG. 4C shows a reprint data specifying screen, wherein print data to be reprinted is specified by the user using the up and down direction buttons 154. It should be noted that the print data to be reprinted is specified by a time (year, month, day, hour, minute, and second) when the print data was previously printed. Thus, the user can identify the print data to be reprinted when a file name to be reprinted is unknown and when a plurality of files having an identical name exist in the ROM 11 of the printing apparatus 1.

FIG. 5 is a schematic diagram illustrating a data configuration in the ROM 11 in the printing apparatus 1 according to the first embodiment of the invention. The ROM 11 stores therein various programs such as a detecting program 11a, a copy number detecting program 11b, a print restriction program 11c, and a printing apparatus program 11d. The detecting program 11a is a program to detect the USB memory 3 when the USB memory 3 is attached to the USB host I/F 16. The copy number detecting program 11b is a program to read a specified number of copies of a printed material to be printed from the USB memory 3 when the USB memory 3 is attached to the USB host I/F 16. The print restriction/permission program 11c is a program to allow a specified number of copies of the print data to be printed. The printing apparatus program 11d is a program to control the printing unit 13 of the printing apparatus 1.

Figure 6:
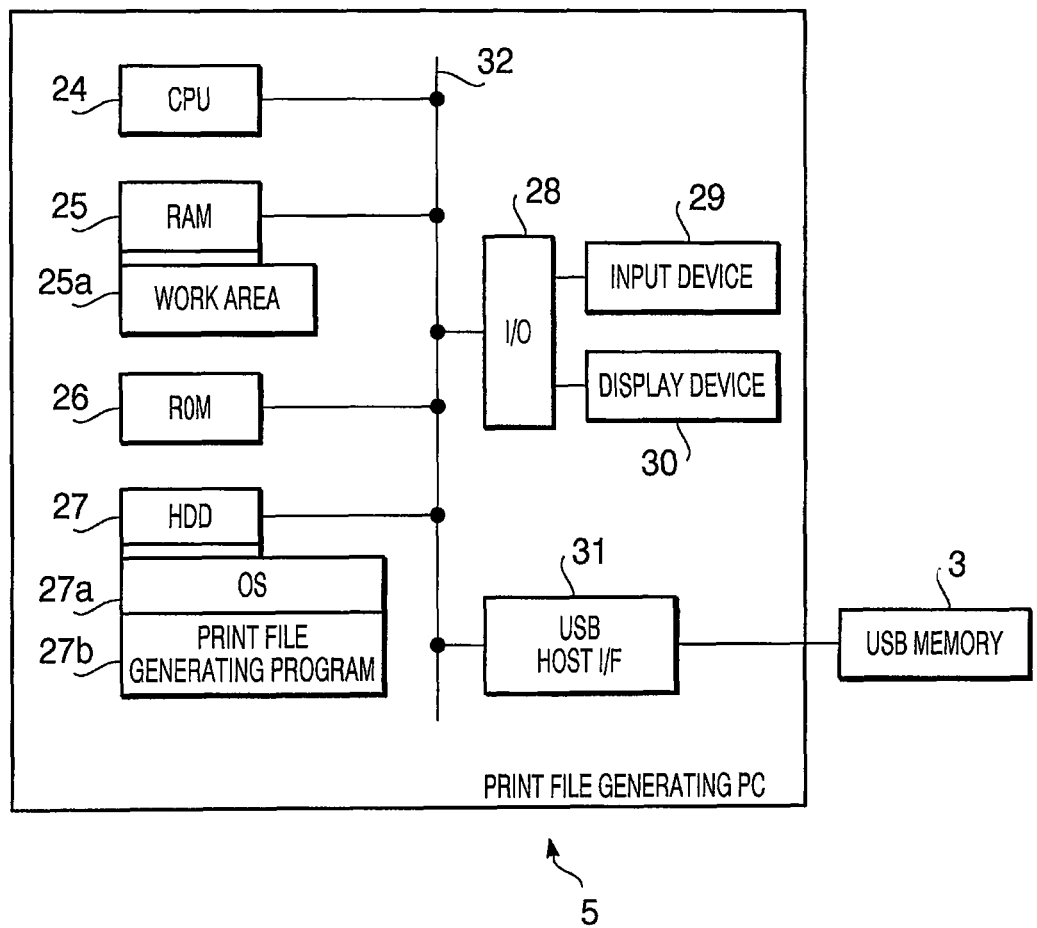
FIG. 6 is a block diagram of a configuration of a PC 5 for generating a print file according to the first embodiment of the invention.

FIG. 6 is a block diagram of a configuration of the print file generating PC 5 according to the first embodiment of the invention. The print file generating PC 5 includes a known CPU 24, a RAM 25m a ROM 26, an HDD (hard disk drive) 27, I/O (input/output) 28, a USB host I/F 31, and a bus line to connect each of the above. The I/O 28 is connected with an input device 29 such as a keyboard and a mouse, and a display unit 30 such as an LCD panel. The RAM 25 includes a work memory 25a as a work area for the CPU 24 to execute various programs. The USB memory 3 is detachably attached to the USB host I/F 31. The HDD 27 stores therein an OS (operating system) 27a and a print file generating program 27b. The OS 27a, for example Windows (registered trademark) provided by Microsoft Corporation, is a basic software for the print file generating PC 5. The print file generating program 27b is a program to generate print file including print data to be printed. As the print file generating program 27b is executed, and the user inputs a predetermined operation by using the input device 29, the print file is generated and stored in the USB memory 3 when the USB memory 3 is attached to the USB host I/F 31.

Hereinafter, operations performed in the print file generating PC 5 functioning in cooperation with the printing apparatus 1 according to the present embodiment will be described.

Figures 7A, 7B:
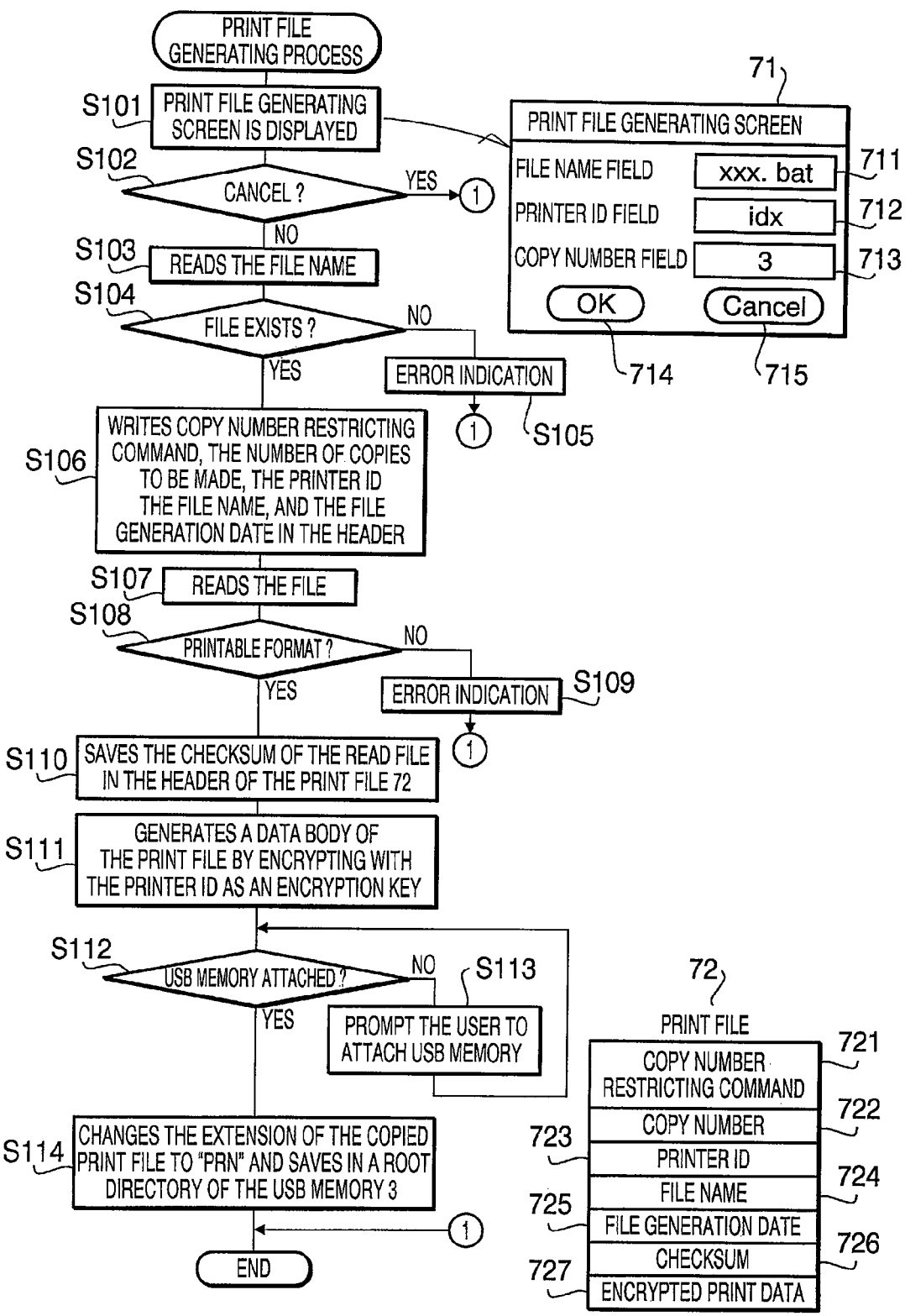
FIG. 7A is a flowchart of a print file generating process performed by a print file generating PC according to the first embodiment of the invention.
FIG. 7B shows a configuration of print file including print data to be printed according to the first embodiment of the invention.

FIG. 7A is a flowchart of a print file generating process according to the first embodiment of the invention. As the print file generating process is started, in S101, a print file generating screen 71 for restricting a copy number is displayed on the display panel of the display unit 30. In the print file generating screen 71 for restricting a copy number, a file name field 711, wherein a name of a file of the print data to be printed (a print file) is inputted, a printer ID field 712, wherein an ID of the printer to be used is inputted, and a copy number field 713, wherein a number of copies to be made is inputted, are included. Further, in the print file generating screen 71, an OK button 714 to be operated when the value inputted in each field is validated and a cancel button 715 to be operated when the value inputted in each filed is invalidated so that the process is terminated are included. It should be noted that the printer ID is information to identify the printing apparatus 1, and if no printing apparatus to be used needs to be specified, a character string as an encryption key, which will be described later, may be inputted instead of the printer ID.

FIG. 7B shows a configuration of the print file 72 including the print data to be printed, which is generated in the print file generating process (see FIG. 7A) according to the first embodiment of the invention. The print file 72 is configured with a header including a copy number restricting command 721, a copy number 722, a printer ID 723, a file name 724, a file generation date 725, and a checksum 726, and a data body having encrypted print data 727. The checksum 726 is obtained from a calculation based on the print data before encryption.

Next, in S102, the CPU 24 judges as to whether the cancel button 715 in the print file generating screen 71 has been clicked by the user. If it is determined that the cancel button 715 has been clicked (S102: YES), the CPU 24 terminates the print file generating process.

In S102, if it is determined that the OK button 714 has been clicked (S102: NO), in S103, the CPU reads the file name inputted in the file name field 711 in the print file generating screen 71. In S104, the CPU 24 judges as to whether a file having the file name as read in S103 exists in the HDD 27 of the print file generating PC 5. If the file having the file name as read in S103 does not exist (S104: NO), the CPU 24 displays an error indication on the display unit 30 (S105) and terminates the print file generating process.

If it is judged that the file having the file name as read in S103 exists (S104: YES), in S106, the CPU 24 writes a copy number restricting command, the number of copies to be made as inputted in the copy number field 713, the printer ID inputted in the printer ID field 712, the file name read in S103, and a current date obtained from the OS 27a as the file generation date in the header of the print file 72 in a predetermined storage area of the HDD 27. Thereafter, in S107, data in the file having the file name as read in S103 is read.

Next, in S108, the CPU 24 judges as to whether the file read in S107 is in a printable format. The judgment is made based on, for example, an extension of the file name of the file read in S107. If the extension indicates a printable format, such as ".bmp" and ".jpg", it is determined that the file is printable. If the extension indicates the file is nonprintable (S108: NO), in S109, the CPU 24 displays an error indication to notify the user that the specified file is not printable and terminates the print file generating process.

In S108, if it is determined that the file read in S107 is in a printable format (S108: YES), in S110, the CPU 24 saves the checksum of the file read in S107 in the header of the print file 72, which is stored in the temporary storage area of the HDD 27. It is noted that a various methods to calculate a checksum are provided, and a method to obtain the checksum by dividing the data included in the file in four bytes and summing up the four byte data is presented as an example of the various methods.

Next, in S111, the CPU 24 generates a data body of the print file 72, which is stored in the temporary area, by encrypting the file read in S107 with an encryption key, which is the printer ID 723 in the present embodiment. It should be noted that the encryption key may not be necessarily be the printer ID 723, but may be an encryption key separately inputted by the user. However, it should be also noted that the printer ID 723 as the encryption key may be advantageous in that the user is not required to input the encryption key separately. Further, it is advantageous in that the print file 72 can be prevented from being output from the other printing devices than the printing apparatus 1 having the printer ID 723.

Next, in S112, the CPU 24 judges as to whether the USB memory 3 is attached to the USB host I/F 31 of the print file generating PC 5. If it is determined that the USB memory 3 is not attached to the USB host I/F 31 (S112: NO), in S113, the CPU 24 prompts the user to attach the USB memory 3 to the USB host I/F 31 by, for example, displaying a message to the user on the display unit 30.

In S112, it is determined that the USB memory 3 is attached to the USB host I/F 31 (Si 12: YES), in S114, the CPU 24 makes a copy of the print file 72, which is stored in the temporary storage area of the HDD 27, and changes the extension of the copied print file to ".prn", which indicates a printable file. Thereafter, the copied print file 72 with the changed extension ".prn" is saved in a root directory of the USB memory 3. The print file generating process is terminated thereafter. When the copied print file 72 is stored in the USB memory 3, the USB memory 3 is removed from the USB host I/F 31.

Figure 8:
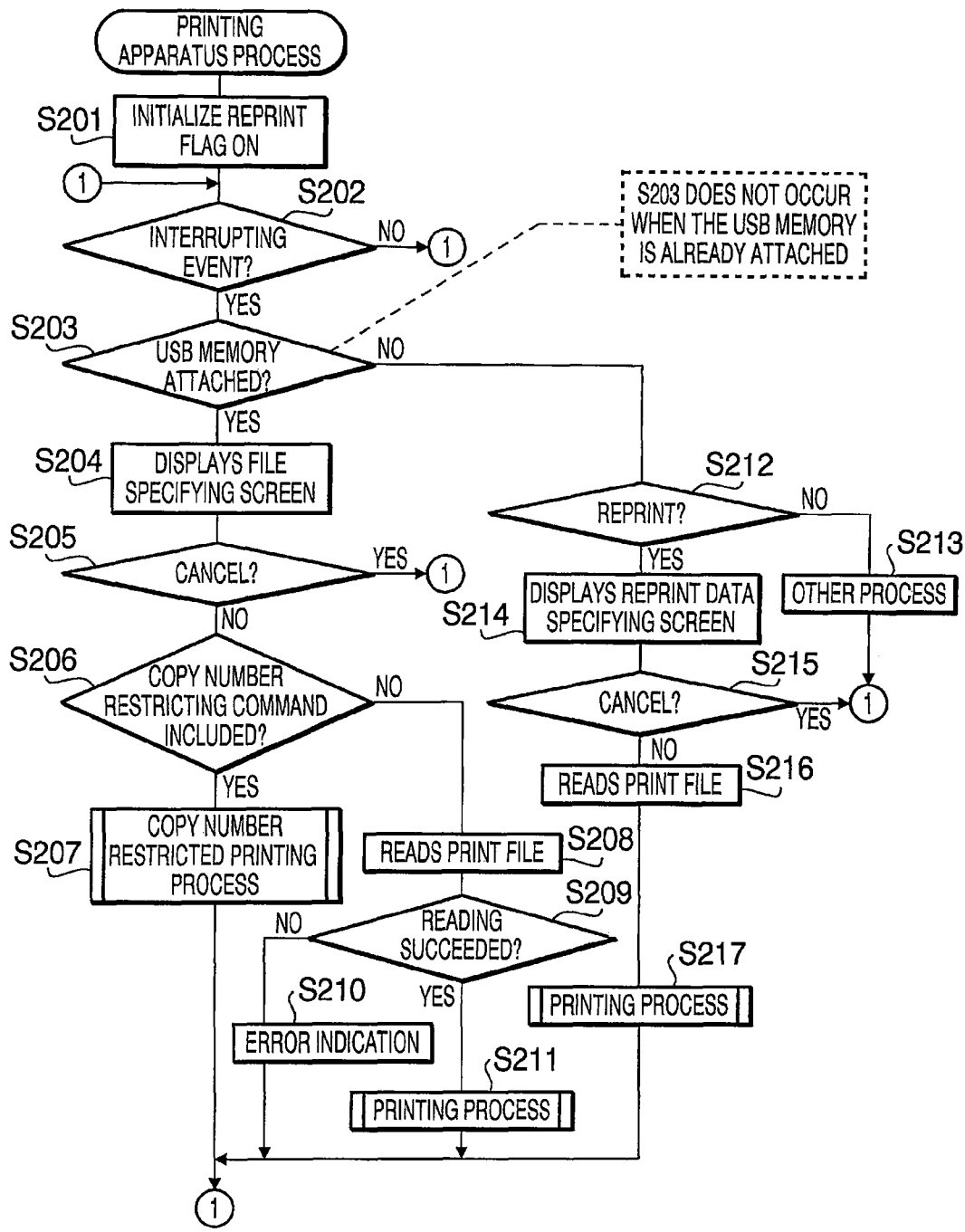
FIG. 8 is a flowchart of a printing apparatus process performed by the printing apparatus 1 according to the first embodiment of the invention.

FIG. 8 is a flowchart of a printing apparatus process performed by the printing apparatus 1 according to the first embodiment of the invention. When the printing apparatus process is started, in S201, the CPU 10 of the printing apparatus 1 initializes a reprint flag in the RAM 12 to ON. The reprint flag indicates as to whether the print file 72 to be printed is saved in the printing apparatus 1 as reprint data, which is allowed to be reprinted. When the reprint flag is set ON, the print file is saved in the printing apparatus 1. When the reprint flag is set OFF, the print file is not saved in the printing apparatus 1. The reprint flag is provided so that the print data can be prevented from being saved in the printing apparatus 1 for reprinting.

Next, in S202, the CPU 10 judges as to whether an interrupting event occurs. If no interrupting event occurs (S202: NO), the CPU 10 waits until an interrupting event occurs.

When an interrupting event occurs (S202:YES), in S203, the CPU 10 judges as to whether the event is attaching the USB memory 3 to the USB host I/F 16. It should be noted that if the USB memory 3 has been attached to the USB host I/F 16 before the printing apparatus process was started, it is determined to be NO in S203, and the CPU 10 proceeds to S212. If the interrupting event is inserting the USB memory 3 to the USB host I/F 16 (S203: YES), in S204, the CPU 10 displays the file specifying screen (see FIG. 4A) on the display unit 14 to the user.

In S205, the CPU 10 judges as to whether the cancel button 152 is pressed. If the user viewing the file specifying screen displayed in S204 presses the cancel button 152 (S205: YES), the CPU 202 returns to S202.

In S205, if the cancel button 152 is not pressed (S205: NO), in S206, the CPU 10 judges as to whether the copy number restricting command 721 is included in the print data 727 stored in the USB memory 3. If the copy number restricting command 721 is included (S206: YES), in S207, the CPU 10 executes a copy number restricted printing process.

Figure 9:
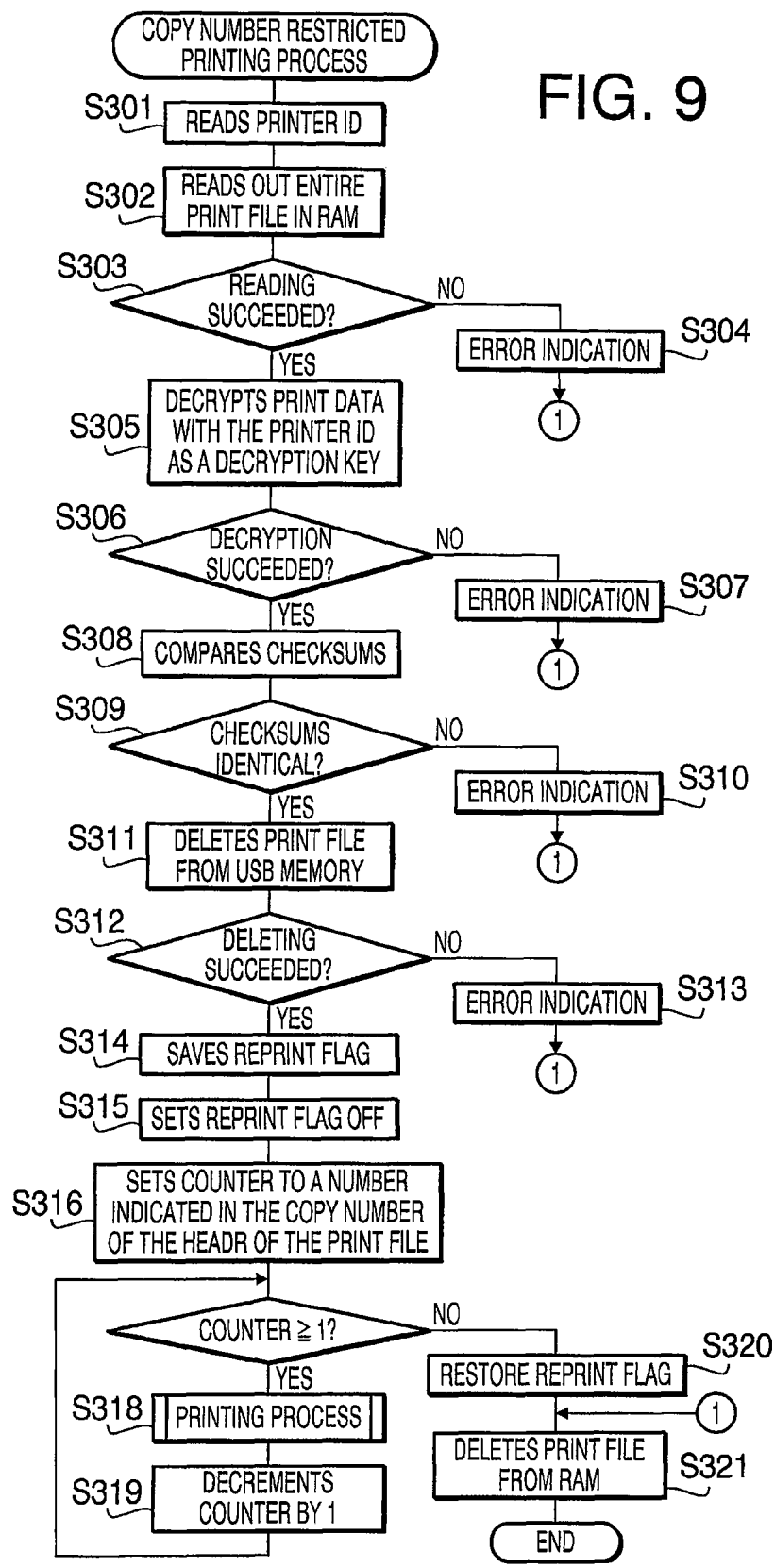
FIG. 9 is a flowchart of a copy number restricted printing process performed by the printing apparatus 1 according to the first embodiment of the invention.

FIG. 9 is a flowchart of the copy number restricted printing process performed by the printing apparatus 1 according to the first embodiment of the invention. As the copy number restricted printing process is started, in S301, the CPU 10 reads the printer ID 723 from the printer ID memory area 18. In S302, the entire print file 72, which has been saved (copied) in the USB memory 3, is read out from the USB memory 3 to be stored in the RAM 12.

Next, in S303, the CPU 10 judges as to whether it succeeded in reading the print file 72 saved (copied) in the USB memory 3 or failed due to a reason such that the USB memory 3 has been removed from the USB host I/F 16. If CPU 10 fails (S303: NO), in S304, the CPU 10 displays an error indication on the display unit 14 for a predetermined time (for example, two seconds) to notify the user of the error in reading. Thereafter, in S321, the CPU 10 deletes the print file 72 from the RAM 12, and terminates the copy number restricted printing process.

In S303, if the CPU 10 succeeds in reading the print file 72 (S303: YES), in S305, the CPU 10 decrypts the print data 727 encrypted in S111 of FIG. 7A with a decryption key, which is the printer ID 723 in the present embodiment. In S306, the CPU 10 judges as to whether the decryption succeeds. In this step, it may be configured such that the user inputs a decryption key instead of the printer ID 723 if the printing apparatus 1 is not specifically designated as a printing apparatus to be used to print the print data 727. In S306, if the decryption does not succeeds (S306: NO), in S307, the CPU 10 displays an error indication on the display unit 14 for a predetermined time (for example, two seconds) to notify the user of the error in the decryption. Thereafter, in S321, the CPU 10 deletes the print file 72 from the RAM 12, and terminates the copy number restricted printing process.

In S306, if the decryption succeeds (S306: YES), in S308, the CPU 10 calculates the checksum of the decrypted print data 727 and compares with the checksum 726 in the header of the print file 72 in the USB memory 3. In S309, the CPU 10 judges as to whether the two checksums are identical.

In S309, if the two checksums are not identical (S309: NO), in S310, the CPU 10 displays an error indication on the display unit 14 for a predetermined time (for example, two seconds) to notify the user of the checksum error. Thereafter, in S321, the CPU 10 deletes the print file 72 from the RAM 12, and terminates the copy number restricted printing process.

In S309, if the two checksums are identical (S309:YES), in S311, the CPU 10 deletes the print file 72 in the USB memory 3 from the USB memory 3. It should be noted that by deleting the print file 72 from the USB memory 3 in this step, which is before the print data 727 is printed in the printing process in S318, the print data 727 is prevented from remaining in the USB memory 3 and being used by an unauthorized user so that leak of the information in the print data 727 can be avoided even when the USB memory 3 is removed from the USB host I/F 16.

Next, in S312, the CPU 10 judges as to whether deleting of the print file 72 from the USB memory 3 succeeds or fails due to a reason such that the USB memory 3 has been removed from the USB host I/F 16 and that the USB memory 3 is write-protected. If the deleting does not succeeds (S312: NO), the CPU 10 displays an error indication on the display unit 14 for a predetermined time (for example, two seconds) to notify the user of the error. Thereafter, in S321, the CPU 10 deletes the print file 72 from the RAM 12, and terminates the copy number restricted printing process. It is noted that if the CPU 11 fails to delete the print file 72 in the USB memory 3, the printing process in S318 is not executed, and the print file in the RAM 12 is deleted so that the data in the print file 72 cannot be printed to be exposed to an unauthorized user. Thus, leak of the information in the print file 72 can be prevented.

In S312, if deleting the print file 72 from the USB memory 3 succeeds (S312: YES), in S314, the CPU 10 saves the value as the reprint flag, and thereafter in S315 sets the reprint flag OFF. It is noted, the value as the reprint flag is reserved so that the data in the print file 72 is not stored in the copy number restricted printing process in S207 (FIG. 8). However, when the process returns from the copy number restricted process, availability of reprinting can be recovered in the printing apparatus 1.

Next, in S316, the CPU 10 sets a counter of the number of copies to be made to a number which is indicated in the copy number 722 of the header of the print file 72 in the RAM 12. In S317, it is judged as to whether the value in the counter is greater than or equal to one.

Figure 10:
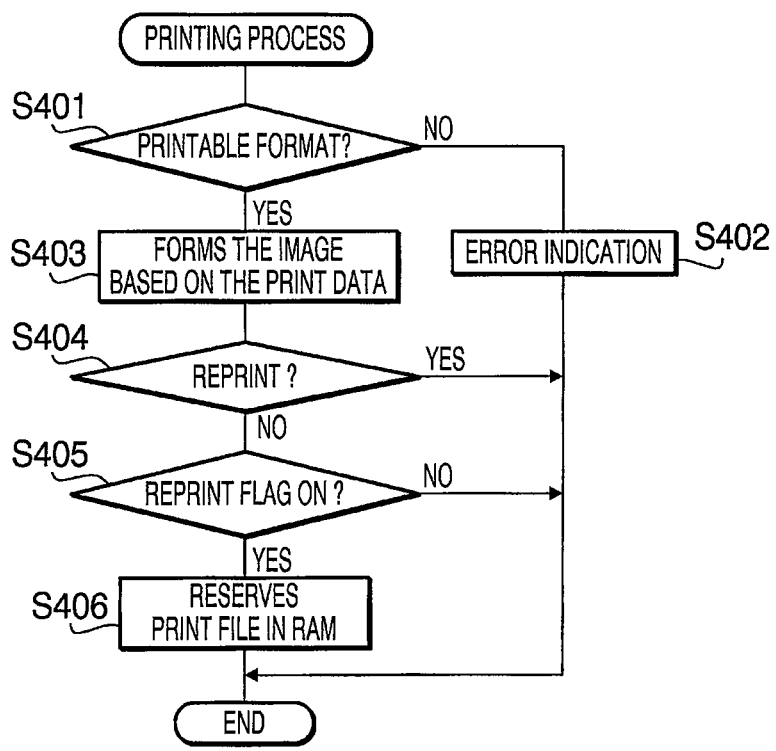
FIG. 10 is a flowchart of a printing process performed by the printing apparatus 1 in according to the first embodiment of the invention.

In S317, if the value in the counter is greater than or equal to one (S317:YES), in S318, the CPU 10 executes the printing process (see FIG. 10).

FIG. 10 is a flowchart of the printing process performed by the printing apparatus 1 in according to the first embodiment of the invention. As the printing process is started, in S401, the CPU 10 of the printing apparatus judges as to whether the print file 72 in the RAM 12 is in a printable format. Specifically, it is judges as to whether the extension of the name of the print file 72 in the RAM 12 is ".prn". If the print file 72 is not in the printable format (S401: NO), the CPU 10 displays an error indication on the display unit 14 for a predetermined time (for example, two seconds) to notify the user of the error in format. Thereafter, the CPU 10 terminates the printing process.

In S401, if the print file 72 in the RAM 72 is in the printable format (S401: YES), in S403, the CPU 10 forms an image corresponding to the data in the print file 72 by the printing unit 13 on a recording sheet.

Next, in S404, the CPU 10 judges as to whether the printing operation executed in S403 is caused by an operation from the user who operated the reprint button 153. If it is determined that the printing operation was caused by the operation to the reprint button 153 (S404: YES), the CPU 10 terminates the printing process. If the printing operation was not caused by the operation to the reprint button 153 (S404: NO), in S405, the CPU 10 judges as to whether the reprint flag is ON. If the reprint flag is not ON, i.e., the reprint flag is OFF (S405: NO), the CPU 10 terminates the printing process. In S405, if the reprint flag is ON (S405: YES), in S406, the CPU saves the print file 72 as reprint data in the RAM 12 and terminates the printing process. If the copy number is restricted, the reprint flag has been set OFF in S315, therefore, the print file 72 as reprint data is not reserved. Thus, making an unauthorized number of copies can be avoided.

As the process returns to the copy number restricted printing process (see FIG. 9), in S319, the CPU 10 decrements the value in the counter by one, and returns to S317. When the value in the counter is smaller than one (S317: NO), in S320, the CPU 10 restore the value as the reprint flag to the reserved value of the reprint flag which was reserved in S314 in FIG. 9. Thereafter, in S321, the CPU 10 deletes the print file 72 from the RAM 12 and terminates the copy number restricted printing process.

As the process returns from the copy number restricted printing process in FIG. 9 to the printing apparatus process in FIG. 8, the CPU 10 returns to S202.

Meanwhile, in S206 in the printing apparatus process, if it is judged that the copy number restricting command 721 is not included in the print data 727 stored in the USB memory 3 (S206: NO), in S208, the CPU 10 reads the print file 72 from the USB memory 3. Thereafter, in S209, it is judged as to whether reading the print file 72 from the USB memory 3 succeeds or fails due to a reason such that the USB memory 3 has been removed from the USB host I/F 16. If the reading does not succeeds and fails (S209: NO), in 210, the CPU 10 displays an error indication on the display unit 14 for a predetermined time (for example, two seconds) to notify the user of the error in reading. Thereafter, the CPU 10 returns to S202.

In S209, if the reading succeeds (S209: YES), in S211, the CPU 10 executes the printing process (see FIG. 10). It is noted that the printing process rather than the copy number restricted printing process is executed when the copy number restricting command 721, which indicates permission to make the specified number of copies of the print data 727, is not detected in S206 so that the restriction in the number of copies to be made is canceled. In 211, the printing process as described above is executed. Thereafter, the CPU 10 returns to S202.

In S203, if the interrupting event is not inserting the USB memory 3 to the USB host I/F 16 (S203: NO), in S212, the CPU 10 judges as to whether an instruction from the user is reprinting the print data 727 stored in the RAM 12. The judgment is made based on an operation to the reprint button 153. If the reprint button 153 is not pressed (S212: NO), the CPU 10 executes a process other than reprinting, such as normal printing in cooperation with a PC. Thereafter, the CPU 10 returns to S202. In S212, if the reprint button 153 is pressed (S212: YES), in S214, the CPU 10 displays the reprint data specifying screen (see FIG. 4C) to the user.

In S215, the CPU 10 judges as to whether the cancel button 152 is pressed. If the user viewing the reprint data specifying screen displayed in S214 presses the cancel button 152 (S215: YES), the CPU 202 returns to S202.

In S215, if the cancel button 152 is not pressed (S215: NO), in S216, print file 72 having the print data 727 to be reprinted is specified by the user using the up and down direction buttons 154. Further, the CPU 10 reads the specified print file 72 from the USB memory 3, and in S211, executes the printing process (see FIG. 10). Thereafter, the CPU 10 returns to S202.

According to the first embodiment as described above, the print file 72 including the copy number restricting command 721, the copy number 722 is generated and store in the USB memory 3, which is attached to the printing apparatus 1, a number of copies to be made can be restricted to the number specified in the copy number 722. Further, the print file 72 can be deleted from the USB memory 3 before the printing process starts so that an exceeding number of copies of a printed material having the content of the print data 727, which is more than the number specified in the copy number 722, can be prevented from being made.

Second Embodiment

In the previous embodiment, it should be noted that the print file 72 in the USB memory 3 is deleted before a first copy of the printed material is made in the copy number restricted printing process (S311 in FIG. 9). Therefore, if the operation of the printing apparatus 1 is unexpectedly terminated before the number of copies as specified are made due to a reason such that the electric failure in the printing apparatus 1, the further copies of the print data 727 cannot be made. However, the copy number restricted process may be configured so that the further number of copies can be made even when the operation of the printing apparatus 1 is unexpectedly terminated.

Figure 11:
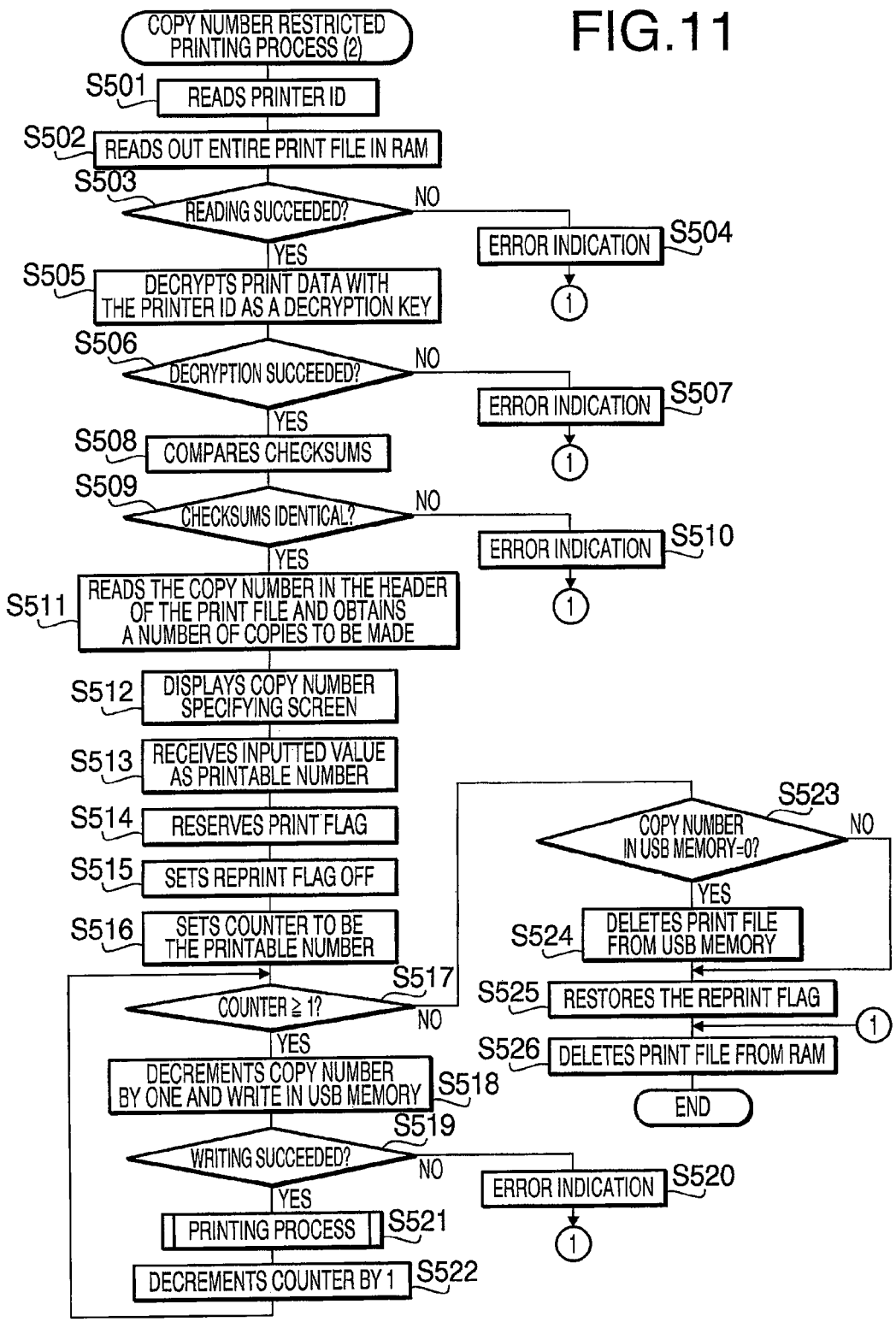
FIG. 11 is a flowchart of a copy number restricted printing process performed by a printing apparatus 200 according to a second embodiment of the invention.

FIG. 11 is a flowchart of a copy number restricted printing process performed by a printing apparatus 200 according to a second embodiment of the invention. In the second embodiment, the copy number restricted printing process is configured such that printing of incomplete copies of the printed material can be resumed even when the operation of the printing apparatus 1 is unexpectedly terminated.

An element configuring the printing apparatus 200 which is similar to the configuration of the previous embodiment is referred to by an identical reference numeral, and description of that will be omitted. Accordingly, the following description will focus merely on the content of the printing apparatus 200 and a process executed in the printing apparatus 200 which are different from those in the printing apparatus 1 and the copy number restricted printing process in the first embodiment.

As the copy number restricted printing process according to the second embodiment is started, in S501, the CPU 10 reads the printer ID 723 from the printer ID memory area 18 of the printing apparatus 200. Thereafter, in S502, the CPU 10 reads out the entire print file 72 from the USB memory 3 to be stored in the RAM 12.

Next, in S503, it is judged as to whether reading the print file 72 from the USB memory 3 succeeds or fails due to a reason such that the USB memory 3 has been removed from the USB host I/F 16. If the reading does not succeeds and fails (S503: NO), in S504, the CPU 10 displays an error indication on the display unit 14 for a predetermined time (for example, two seconds) to notify the user of the error in reading. Thereafter, in S526, the CPU 10 deletes the print file 72 from the RAM 12 and terminates the copy number restricted printing process.

In S503, if the CPU 10 succeeds in reading the print file 72 (S503: YES), in S505, the CPU 10 decrypts the print data 727 encrypted in S111 of FIG. 7A with a decryption key, which is the printer ID 723 in the present embodiment. In S506, the CPU 10 judges as to whether the decryption succeeds. In this step, it may be configured such that the user inputs a decryption key instead of the printer ID 723 if the printing apparatus 200 is not specifically designated as a printing apparatus to be used to print the print data 727. In 506, if the decryption does not succeeds (S506: NO), in S507, the CPU 10 displays an error indication on the display unit 14 for a predetermined time (for example, two seconds) to notify the user of the error in the decryption. Thereafter, in S526, the CPU 10 deletes the print file 72 from the RAM 12, and terminates the copy number restricted printing process.

In S506, if the decryption succeeds (S506: YES), in S508, the CPU 10 calculates the checksum of the decrypted print data 727 and compares with the checksum 726 in the header of the print file 72 in the USB memory 3. In S509, the CPU 10 judges as to whether the two checksums are identical.

In S509, if the two checksums are not identical (S509: NO), in S510, the CPU 10 displays an error indication on the display unit 14 for a predetermined time (for example, two seconds) to notify the user of the checksum error. Thereafter, in S521, the CPU 10 deletes the print file 72 from the RAM 12, and terminates the copy number restricted printing process.

In S509, if the two checksums are identical (S509: YES), in S511, the CPU 10 reads the copy number 722 in the header of the print file 72 and obtains a number of copies to be made (a printable number). Thereafter, in S512, displays a copy number specifying screen (see FIG. 4B).

FIG. 4B shows an illustrative view of the copy number specifying screen. In FIG. 4B, a maximum printable number (MAX) of copies of the printed material to be made according to the print data 727 is indicated. The maximum printable number of copies of the printed material is stored in the USB memory 3. The printable number, which is a number of copies to be made in the printing apparatus 200 during the copy number restricted printing process according to the second embodiment, can be specified by the user operating the up and down direction buttons 154 within a range from 1 to the maximum printable number.

As the copy number specifying screen is displayed in S512, the user inputs the printable number, which is between 1 and the maximum printable number specified as the copy number 722, as prompted. It should be noted that the process may be, for example, configured such that in a step following 512, it is judged as to whether the number specified by the user is a number greater than zero and a number less than or equal to the maximum printable number. If the number inputted by the user is greater than zero and less than or equal to the maximum printable number the process may proceeds to S513. If it is determined that the number inputted by the user is smaller than one or greater than the maximum printable number, the CPU 10 returns to S512. In S513, the CPU 10 receives the printable number inputted by the user and sets the received printable number as the number of copies to be made. In S514, the CPU 10 reserves the value in the reprint flag. Thereafter, in S515, the CPU 10 sets the reprint flag OFF.

Next, in S516, the CPU 10 sets a counter of the number of copies to be the printable number. Thereafter, in S517, it is judged as to whether the value in the counter is greater than or equal to one.

In S517, if the value in the counter is greater than or equal to one (S517: YES), in S518, the CPU 10 decrements the value in the copy number 722 of the header in the print file 72 by one and writes the decremented value in the copy number 722 of the header in the print file 72 stored in the USB memory 3. The decremented value in the copy number 722 of the header in the print file 72 being a remaining number of copies to be made is indicated as a current maximum printable number "n" and is displayed as "MAX: n" in the copy number specifying screen. Thus, the remaining printable number, which is obtained by subtracting the number of copies made from the copy number 722, is reserved in the USB memory 3 to be displayed on the display unit 14 when the remaining number of copies are made. Therefore, the specified number of copies can be made in one or more of printing operations. Further, the user can recognize the remaining printable number of copies to be made promptly.

Nest, in S519, the CPU 10 judges as to whether writing the decremented value in the USB memory 3 succeeds or fails due to a reason such that the USB memory 3 has been removed from the USB host I/F 16 and that the USB memory 3 is write-protected. If the writing does not succeeds (S519: NO), in S520, the CPU 10 displays an error indication on the display unit 14 for a predetermined time (for example, two seconds) to notify the user of the error. Thereafter, in S526, the CPU 10 deletes the print file 72 from the RAM 12, and terminates the copy number restricted printing process. It is noted that if the CPU 11 fails to write the decremented value in the print file 72 in the USB memory 3, the printing process in S521 is not executed, and the print file in the RAM 12 is deleted so that the data in the print file 72 cannot be printed in an excessive number of copies to be exposed to an unauthorized user even if the USB memory 3 is removed from and attached to the USB host I/F 16. Thus, leak of the information in the print file 72 can be prevented.

In S519, if the CPU 10 succeeds in writing the decremented value in the USB memory 3 (S519: YES), in S521, the CPU 10 executes the printing process (see FIG. 10). Thereafter, in S522, the CPU 10 decrements the value in the counter by one and returns to S517.

In S517, if the value in the counter is less than one (S517: NO), in S523, the CPU 10 judges as to whether the copy number 722 in the print file 72 stored in the USB memory 3 is zero. If the copy number 722 in the print file 72 in the USB memory 3 is zero (S523: YES), in S524, the CPU 10 deletes the print file 72 from the USB memory 3. Thus, the print file 72 stored in the USB memory 3 is removed when a total number of copies made reaches to the number indicated in the copy number 722. Therefore, the print data 727 can be printed in the accurate number specified in the copy number 722, and the print file 72 can be prevented from leaks after the processes to print the print data 727 are completed. In S523, if the copy number 722 is not zero (S523: NO), the CPU 10 skips S524 and proceeds to S525.

In S525, the CPU 10 restores the value as the reprint flag to the reserved value of the reprint flag which was reserved in S514. Thereafter, in S526, the CPU 10 deletes the print file 72 from the RAM 12 and terminates the copy number restricted printing process.

According to the second embodiment described above, the printable number as the number of copies to be made can be specified within the range between 1 and the copy number 722, and the print file 72 is deleted from the USB memory 3 when the total number of copies made reaches to the copy number 722. Therefore, the print data 727 can be printed in the remaining number of copies until the total number of copies made reaches to the copy number 722. In addition, in S518, the copy number 722 in the USB memory 3 is decremented before the printing process is executed in S521. Therefore, if the operations of the printing apparatus 200 are unexpectedly terminated, the remaining number of copies can be securely made by using the USB memory 3 when the printing apparatus 1 recovers. It is noted that, however, printing of the copy in progress when the printing apparatus 200 is unexpectedly terminated may not be completed.

Third Embodiment

In the previous embodiments, the CPU 10 in each of the printing apparatuses 1, 200 writes and deletes the data in the USB memory 3 (see S311 in FIG. 9 and S518 in FIG. 11 for example). In these steps, a write-protected USB memory 3 cannot be used. However, in a third embodiment, such a write-protected USB memory 3 can be used as the printing apparatus is allowed to arbitrarily reserve specific information to identify the print file 72 and a printable number while the number of copies to be made is restricted.

Figures 12A, 12B:
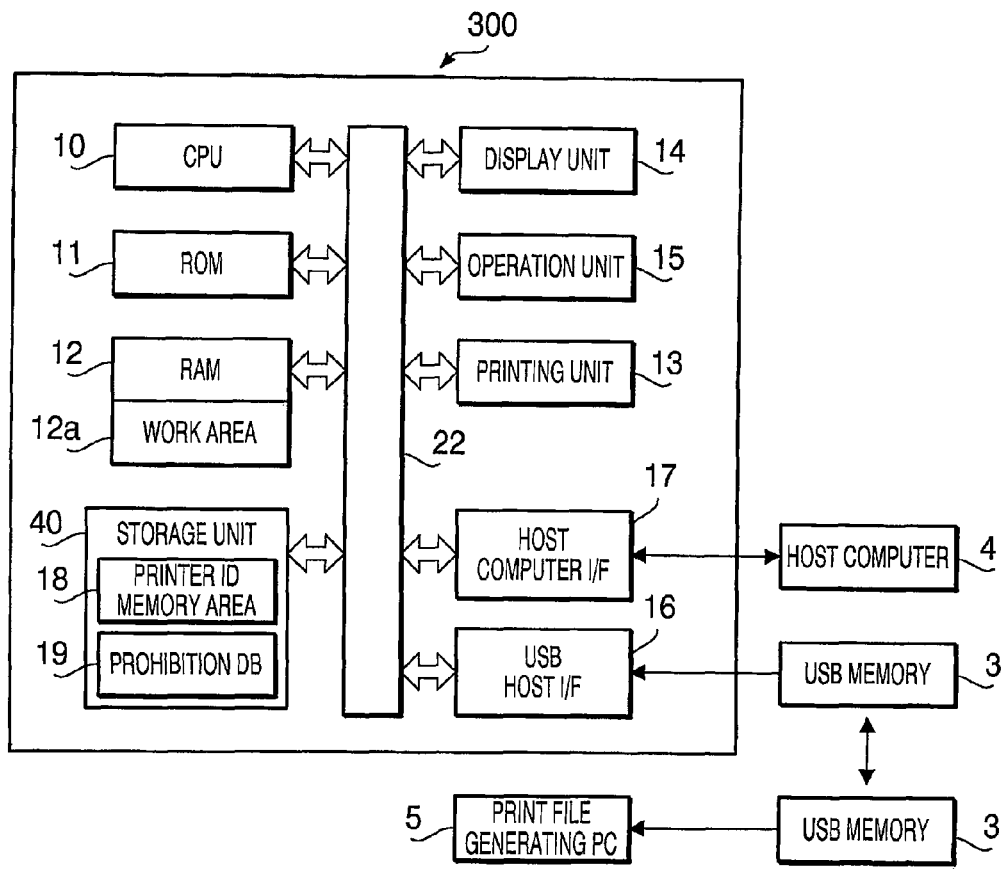
FIG. 12A is a block diagram of an electrical configuration of the printing apparatus 300 according to a third embodiment of the invention.
FIG. 12B shows a configuration of a prohibition DB (database) according to the third embodiment of the invention.

FIG. 12 is a block diagram of an electrical configuration of the printing apparatus 300 according to a third embodiment of the invention. It is noted that in the printing apparatus 300 in the third embodiment the printer ID memory area 18 in the previous embodiments is replaced with a storage unit 40 having a printer ID area 18 and a prohibition DB (database) 19. The storage unit 40 is configured with a nonvolatile memory such as a flash ROM. FIG. 12B shows a configuration of the prohibition DB 19 according to the third embodiment of the invention.

The prohibition DB 19 in the storage unit 40 in the present embodiment is configured to include at least one record, which has a prohibition code and a copy number. With the prohibition DB 19, one specific printing apparatus 300 is allowed to perform printing the print data 727 for more than once. The prohibition code includes a code creation date, the file name of the print file 72 to be printed, and the checksum of the decrypted print data 727 which is identical to the checksum 726 in the header of the print file 72 in the RAM 12. It should be noted that a method to effectively organize the prohibition DB 19 is not limited, and for example, it may be configured such that an old prohibition DB 19 is selectively or automatically deleted.

An element configuring the printing apparatus 300 which is similar to the configuration of the previous embodiments is referred to by an identical reference numeral, and description of that will be omitted. Accordingly, the following description will focus merely on the content of the printing apparatus 300 and a process executed in the printing apparatus 300 which are different from those in the printing apparatuses 1, 200 and the copy number restricted printing process in the previous embodiments.

Figure 13:
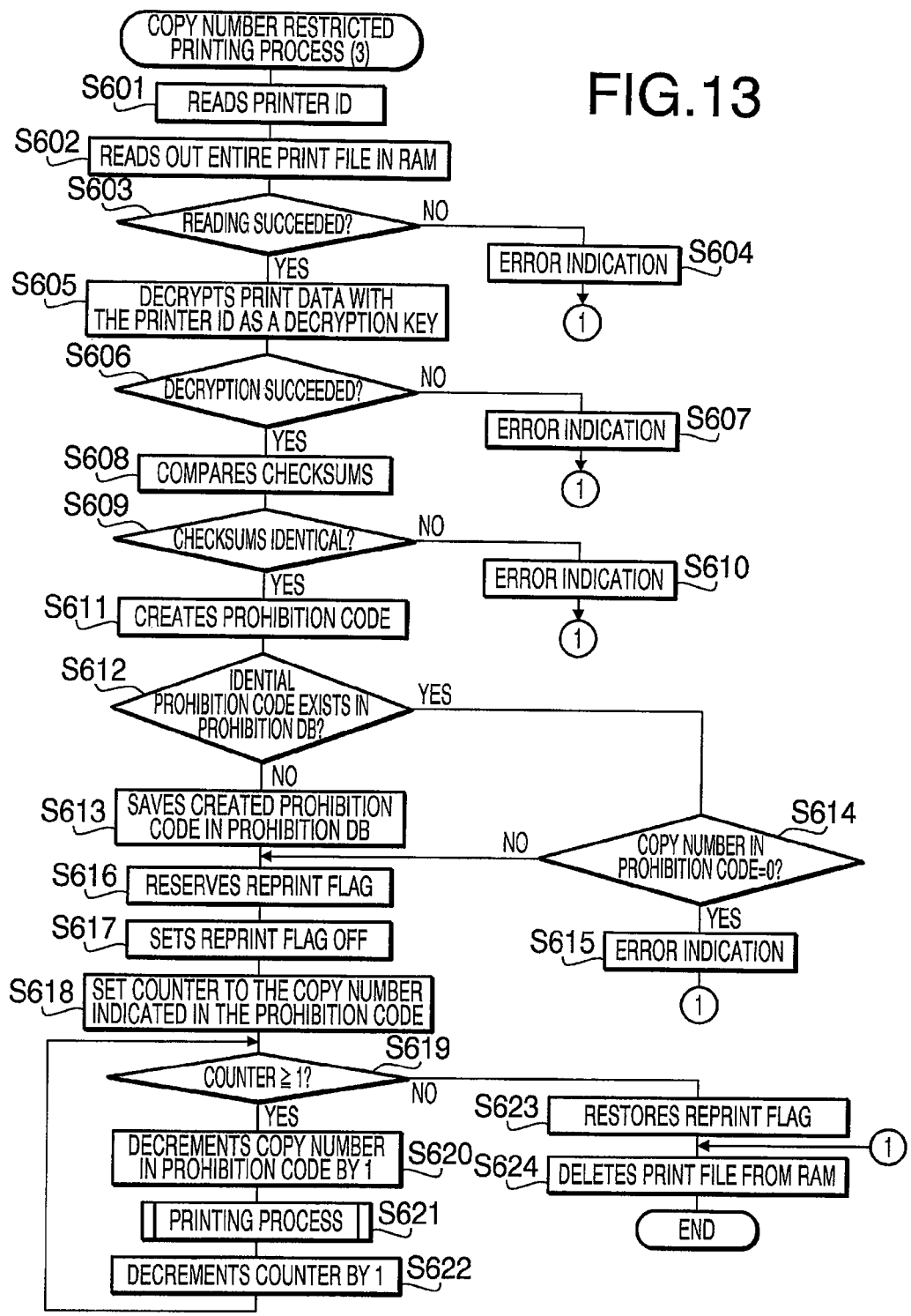
FIG. 13 is a flowchart of a copy number restricted printing process performed by a printing apparatus 300 according to the third embodiment of the invention.

FIG. 13A is a flowchart of a copy number restricted printing process performed by the printing apparatus 300 according to the third embodiment of the invention.

As the copy number restricted printing process according to the third embodiment is started, in S601, the CPU 10 reads the printer ID from the printer ID memory area 18. Thereafter, in S602, the entire print file 72 is read out to the RAM 12.

Next, in S603, it is judged as to whether reading the print file 72 from the USB memory 3 succeeds or fails due to a reason such that the USB memory 3 has been removed from the USB host I/F 16. If the reading does not succeeds and fails (S603: NO), in S604, the CPU 10 displays an error indication on the display unit 14 for a predetermined time (for example, two seconds) to notify the user of the error in reading. Thereafter, in S624, the CPU 10 deletes the print file 72 from the RAM 12 and terminates the copy number restricted printing process.

In S603, if the CPU 10 succeeds in reading the print file 72 (S603: YES), in S605, the CPU 10 decrypts the print data 727 encrypted in SI 11 of FIG. 7A with a decryption key, which is the printer ID 723 in the present embodiment. In S606, the CPU 10 judges as to whether the decryption succeeds. In this step, it may be configured such that the user inputs a decryption key instead of the printer ID 723 if the printing apparatus 300 is not specifically designated as a printing apparatus to be used to print the print data 727. In S606, if the decryption does not succeeds (S606: NO), in S607, the CPU 10 displays an error indication on the display unit 14 for a predetermined time (for example, two seconds) to notify the user of the error in the decryption. Thereafter, in S624, the CPU 10 deletes the print file 72 from the RAM 12, and terminates the copy number restricted printing process.

In S606, if the decryption succeeds (S606: YES), in S608, the CPU 10 calculates the checksum of the decrypted print data 727 and compares with the checksum 726 in the header of the print file 72 in the USB memory 3. In S609, the CPU 10 judges as to whether the two checksums are identical.

In S609, if the two checksums are not identical (S609: NO), in S610, the CPU 10 displays an error indication on the display unit 14 for a predetermined time (for example, two seconds) to notify the user of the checksum error. Thereafter, in S624, the CPU 10 deletes the print file 72 from the RAM 12, and terminates the copy number restricted printing process.

In S609, if the two checksums are identical (S609: YES), in S611, the CPU 10 creates a prohibition code, which includes a code creation date, the file name of the print file 72, and the checksum. Thereafter, in S612, the CPU 10 judges as to whether an identical prohibition code exists in the prohibition DB 19.

In S612, if no identical prohibition code is included in the prohibition DB 19 (S612: NO), it is considered that the print file 72 having the print data 727 has not been printed in the printing apparatus 300 previously. Accordingly, in S613, the CPU 10 saves the prohibition code created in S611 and the copy number 722 in the header of the print file 72 in the prohibition DB 19. In the present embodiment, it is configured such that the print data 727 can be printed in the specified number of copies as specified by the copy number 722, and the prohibition code is saved if no prohibition code corresponding to the print data 727 exists in the prohibition DB 19. Therefore, a maximum number of copies to be made in the printing apparatus 300 having the prohibition code can be maintained to the number specified as the copy number 722.

In S612, if an identical prohibition code exists in the prohibition DB 19 (S612: YES), it is considered that the print file 72 having the print data 727 has been printed previously in the printing apparatus 300. Accordingly, in S614, the CPU 10 judges as to whether the copy number indicated in the prohibition code identical to the prohibition code created in S611 is zero. If the copy number indicated the prohibition code in the prohibition DB 19 indicates zero (S614: YES), it is considered that the number of copies as specified by the copy number 722 have been made. Therefore, in S615, the CPU 10 displays an error indication on the display unit 14 for a predetermined time (for example, two seconds) to notify the user of the error. Thereafter, in S624, the CPU 10 deletes the print file 72 from the RAM 12, and terminates the copy number restricted printing process.

In S613, after the CPU 10 saves the prohibition code created in S611 and the copy number 722 in the header of the print file 72 in the prohibition DB 19, and in S614, if the copy number indicated in the prohibition DB 19 is not zero (S614: NO), in S616, the CPU 10 reserves the value in the reprint flag. Thereafter, in S615, the CPU 10 sets the reprint flag OFF.

Next, in S618, the CPU 10 sets a counter of the number of copies to be the copy number indicated in the prohibition code in the prohibition DB 19. Thereafter, in S619, it is judged as to whether the value in the counter is greater than or equal to one.

In S619, if the value in the counter is greater than or equal to one (S619: YES), in S620, the CPU 10 decrements the value in the copy number of the prohibition code in the prohibition DB 19 by one, and in S621, executes the printing process (see FIG. 10). It is noted that in the present embodiment when the prohibition code corresponding to the print file 72 exists and a number of copies to be made remains, the operation for printing is performed, and the copy number as the number of copies to be made in the prohibition code corresponding to the print vile 72 is decremented by one. Accordingly, the remaining printable number of copies to be made can be recognized promptly.

Following the printing process in S621, in S622, the value in the counter is decremented by one. Thereafter, the CPU 10 returns to S619.

In S619, if the value in the counter is less than one (S619: NO), in S623, the CPU 10 restores the value as the reprint flag to the reserved value of the reprint flag which was reserved in S616. Thereafter, in S624, the CPU 10 deletes the print file 72 from the RAM 12 and terminates the copy number restricted printing process.

According to the third embodiment described above, the prohibition code corresponding to the print data 727 to be printed and the copy number are stored in the prohibition DB 19. Therefore, a number of copies to be made in the printing apparatus 300 storing the identical prohibition code therein can be restricted up to the number specified by the copy number 722. In addition, in S620, the copy number indicated in the prohibition code in the prohibition DB 19 is decremented before the printing process is executed in S621. Therefore, if the operations of the printing apparatus 300 are unexpectedly terminated, the remaining number of copies can be securely made by using the USB memory 3 when the printing apparatus 1 recovers. It is noted that, however, printing of the copy in progress when the printing apparatus 200 is unexpectedly terminated may not be completed.

Fourth Embodiment

Figure 14:
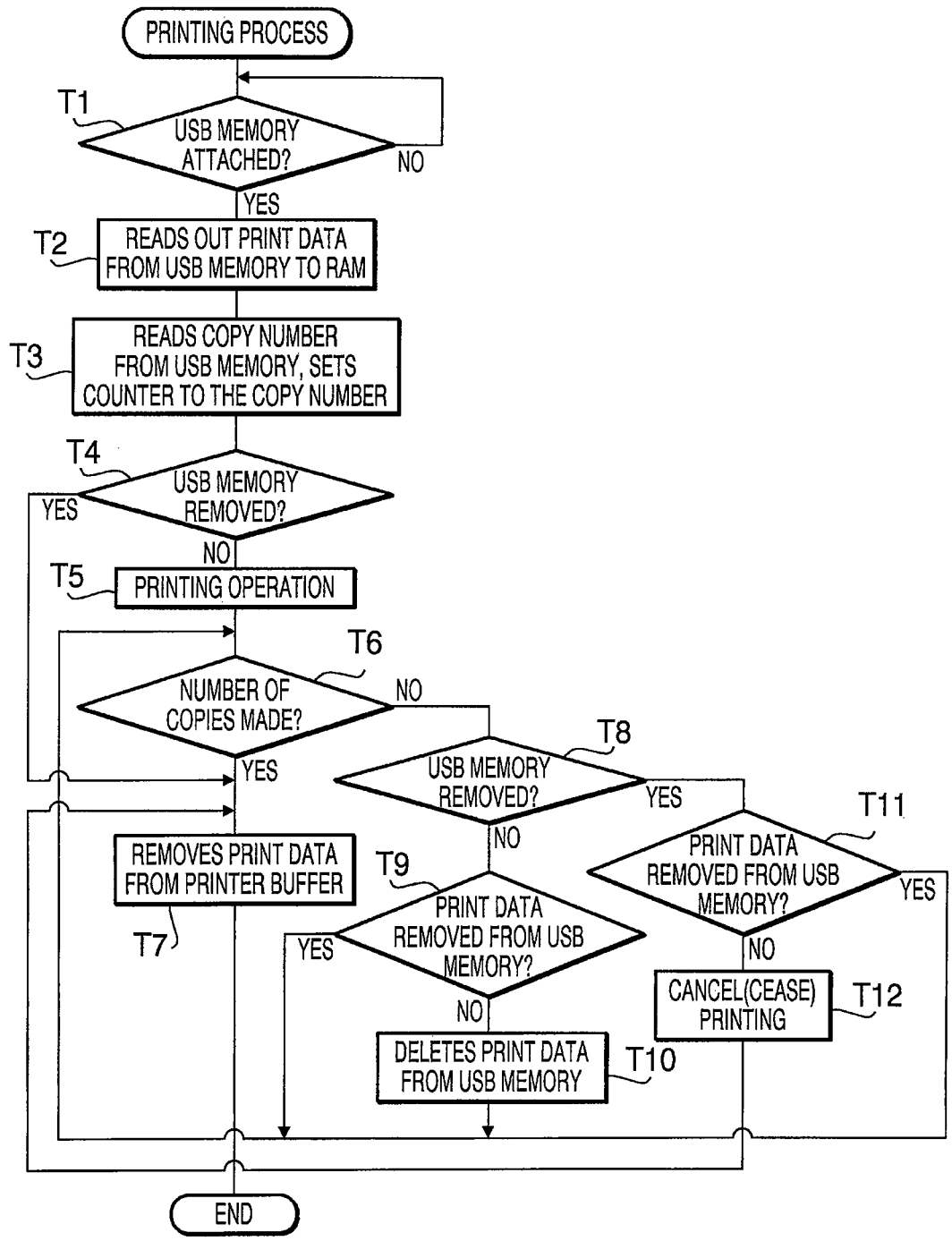
FIG. 14 is a flowchart of a printing process performed by a printing apparatus 400 in according to a fourth embodiment of the invention.

Hereinafter, a fourth embodiment according to the present invention will be described. FIG. 14 is a flowchart of a printing process performed by the printing apparatus 400 in according to the fourth embodiment of the invention.

As the printing process according to the fourth embodiment is started, in T1, the CPU 10 judges as to whether an event wherein a USB memory becomes inserted to the USB host I/F 16 of the printing apparatus 400 occurs. If the inserting event occurs (T1: YES), in T2, the print file 72 is read out from the USB memory 3 to a printer buffer (not shown) in the RAM 12.

Next, in T3, the CPU 10 reads the copy number 722 from the USB memory 3 and sets a counter of the number of copies to be made to a number which is indicated in the copy number 722 of the header of the print file 72 in the RAM 12. In T4, it is judged as to whether the USB memory 3 has been removed from the USB host I/F 16. If the USB memory 3 has not been removed from the USB host I/F 16 and remains attached (T4: NO), in T5, the CPU 10 executes a printing operation to make a number of copies, as read in T3, of the print data 727.

Next, in T6, the CPU 10 judges as to whether the number of copies have been made and the printing operation completed. If the printing operation is not complete (T6: NO), in T8, the CPU 10 judges as to whether the USB memory 3 has been removed from the USB host I/F 16. If the USB memory 3 has not been removed and remains attached (T8: NO), in T9, the CPU 10 judges as to whether the print file 72 has been deleted from the USB memory 3. If the print file 72 has not been deleted from the USB memory 3 (T9: NO), in T11, the CPU 10 deletes the print file 72 from the USB memory 3 and returns to T6. In T6, if the specified number of copies as read in T3 have been made and the printing operation completed (T6: YES), in T7, the CPU 10 deletes the print file 72 from the printer buffer in the RAM 12 and terminates the printing process.

In T8, if the USB memory 3 is removed from the USB host I/F 16 during the printing operation (T8: YES), in T11, the CPU 10 judges as to whether the print file 72 has been deleted from the USB memory 3. If the print file 72 has been deleted from the USB memory 3 (T11: YES), the CPU 10 returns to T6. Thereafter, the number of copies as read in T3 are made and the printing operation completed (T6: YES), in T7, the CPU 10 deletes the print file 72 from the printer buffer in the RAM 12 and terminates the process.

In T11, if the print data 72 has not been deleted from the USB memory 3 (T11: NO), in T12, the CPU 10 cancels the printing operation. Thereafter, in T7, the CPU 10 deletes the print file 72 from the printer buffer in the RAM 12 and terminates the process.

According to the fourth embodiment as described above, when the print data 72 is deleted from the USB memory 3 (T10) and when the USB memory 3 is removed from the USB host I/F 16 after the print file 72 is deleted from the USB memory 3, it is determined that the USB memory 3 has not been removed from the USB host I/F 16 (T8: NO) so that printing of the number of copies as specified by the copy number 722 read in T3 can complete. Meanwhile, when the print data 72 is not deleted from the USB memory 3 (T4: YES, T11: NO) due to a reason such that the USB memory 3 has been removed from the USB host I/F 16, the printing operation is cancelled (END, T12) so that the print data 727 is not be exposed to an unauthorized user and prevented from leaks. Thus, canceling the printing operation includes a flow (T4: YES, T7, END) wherein no copy of the print data 727 is made and a flow (T11: NO, T12, T7, END) wherein the printing operation is once started and cancelled before the number of copies specified by the copy number 722 completes. In these flows, the print data 72 can be prevented from being exposed to an unauthorized user and from leaks.

Fifth Embodiment

Figure 15:
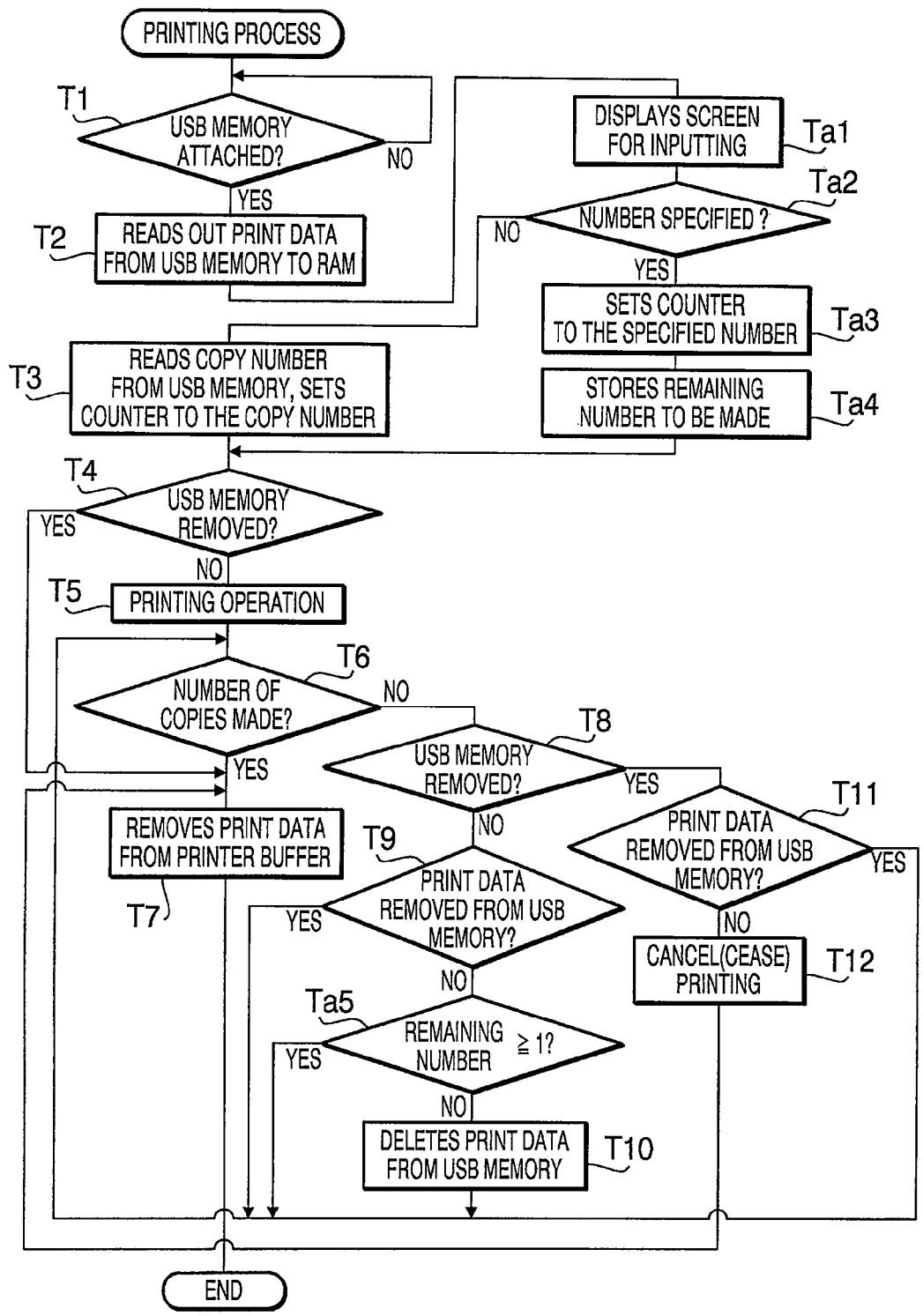
FIG. 15 is a flowchart of a printing process performed by the printing apparatus 500 in according to a fifth embodiment of the invention.

Hereinafter, a fifth embodiment of the present invention will be described. FIG. 15 is a flowchart of a printing process performed by a printing apparatus 500 in according to a fifth embodiment of the invention.

In the fifth embodiment, the printing apparatus 500 may be configured similarly to the printing apparatus 400 in the fourth embodiment. It is noted that the printing process in the fifth embodiment is different from the printing process in the fourth embodiment in that steps Ta1-Ta4 are added in FIG. 15 between the steps T2 and T3 in FIG. 14 of the fourth embodiment. Further, Ta5 is added between T9 and T10. Accordingly, only the steps Ta1-Ta4 and Ta5 will be described hereinbelow.

As the print file 72 is read out from the USB memory 3 to a printer buffer (not shown) in the RAM 12 (T2), in Ta1, the CPU 10 displays a screen (not shown) wherein the user inputs a number of copies to be made. Thereafter, in Ta2, the CPU 10 judges as to whether the number of copies to be made is specified by the user. In Ta1, if the number of copies is not specified (Ta2: NO), in T3, the CPU 10 reads the copy number 722 from the USB memory 3 and sets a counter of the number of copies to be made to a number which is indicated in the copy number 722 of the header of the print file 72 in the RAM 12. In Ta2, if the number of copies to be made is specified (Ta2: YES), in Ta3, the CPU 10 sets the counter of the number of copies to be made to the number specified by the user in Ta2. Thereafter, in Ta4, the CPU 10 stores a remaining number of copies to be made, which is obtained by subtracting the number specified by the user in Ta1 from the copy number 22, in the USB memory 3. Thereafter the CPU 10 returns to T4 and executes the following steps as described in the fourth embodiment.

In T9, if the print file 72 has not been deleted from the USB memory 3 (T9: NO), in Ta5, the CPU 10 judges as to whether the remaining number of copies obtained and stored in the USB memory 3 in Ta4 is greater than or equal to one. If the remaining number of copies to be made is greater than or equal to one (Ta5: YES), the CPU 10 returns to T6. Meanwhile, if the remaining number of copies to be made is less than one (Ta5: NO), in T11, the CPU 10 deletes the print file 72 from the USB memory 3 and returns to T6.

According to the fifth embodiment described above, the remaining number of copies to be made is obtained by subtracting the number specified by the user from the copy number 722. Therefore, when copies of the print data 727 are made in different timing, a total number of copies to be made can be restricted within a range as specified by the copy number 722, which is specified in S101 in the print file generating process (see FIG. 7A).

Although examples of carrying out the invention have been described, those skilled in the art will appreciate that there are numerous variations and permutations of the printing apparatus that falls within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, in S512 in the copy number restricted printing process (see FIG. 11), it may be configured such that the printable number initially displayed in the copy number specifying screen is one, and if the user does not operate the up and down direction buttons 154 to specify the printable number, one as the printable number is entered.

For another example, in S312 in the copy number restricted printing process (see FIG. 9), the print file 72 may not be necessarily deleted from the USB memory 3, but may be maintained as long as the print file 72 is disabled to be accessed by the printing apparatus 1 and other devices.

What is claimed is:

1. A printing apparatus for printing images on sheets of paper based on print data read out from a removable memory medium, the printing apparatus comprising:
    an interface to which the removable memory medium is connected;
    a printing unit configured to print images on sheets of paper based on the print data;
    a processing unit; and
    memory storing executable instructions that, when executed by the processing unit, cause the processing unit to execute processes of:
        reading out the print data and a specified number of copies, from the removable memory medium connected to the printing apparatus;
        storing the print data, read out from the removable memory medium, in a data storage of the printing apparatus;
        attempting to delete the print data stored in the removable memory medium;
        deleting the print data stored in the data storage, without printing the print data, when attempting to delete the print data stored in the removable memory medium has failed; and
        after the print data has been deleted from the removable memory medium, printing the specified number of copies of the print data based on the print data stored in the data storage of the printing apparatus and the specified number read out from the removable memory medium, and
        deleting the print data stored in the data storage after completion of printing.

2. The printing apparatus according to claim 1, wherein the specified number is equal to a maximum printable number of sheets if no instruction is received by the printing apparatus.

3. The printing apparatus according to claim 1, wherein the instructions, when executed by the processing unit, cause the processing unit to execute the further process of obtaining a remaining printable number, which indicates a remaining number of sheets on which printing is allowed, by subtracting a number of sheets on which printing has occurred from the specified number, the remaining printable number being stored so that a total number of sheets on which printing is made is restricted to be within the specified number.

4. The printing apparatus according to claim 1, wherein the instructions, when executed by the processing unit further cause the processing unit to execute further processes of:
    generating a record corresponding to the print data; and
    storing the record of the print data generated,
    wherein up to the specified number of copies is printed, and the record corresponding to the print data generated is stored when no record corresponding to the print data is present.

5. The printing apparatus according to claim 4,
    wherein the instructions, when executed by the processing unit, cause the processing unit to execute the further process of obtaining a remaining printable number, which indicates a remaining number of sheets on which printing is allowed, by subtracting a number of sheets on which printing has occurred from the specified number, the remaining printable number being stored so that a total on which printing is made is restricted to be within the specified number; and
    wherein the record corresponding to the print data indicates that the print data has been used to print the sheets and the remaining printable number of the sheets according to the print data.

6. The printing apparatus according to claim 5,
    wherein the printing unit prints images on a sheet when the record corresponding to the stored print data and the remaining printable number is greater than zero and smaller than the specified number, and
    wherein the remaining printable number is decremented by one.

7. The printing apparatus according to claim 1, wherein the specified number is one if no instruction is given to the printing apparatus from a user.

8. The printing apparatus according to claim 1, further comprising:
    a print data storing system, which is configured to record the print data having been used in the printing apparatus in the data storage,
    wherein the print data storing system is disabled when printable number restricting information corresponding to the print data is included in the removable memory medium.

9. The printing apparatus according to claim 1, wherein the printing apparatus is configured to determine whether the attempt to delete the print data stored in the removable memory medium was successful.

10. A non-transitory computer usable medium comprising computer readable instructions for printing images on sheets of paper according to print data stored in a removable memory medium, having an interface to which the removable memory medium is connected so that the print data stored in the removable memory medium is inputted to the computer, by executing steps of:

reading out the print data and a specified number of copies, from the removable memory medium connected to a printing apparatus;

storing the print data, read out from the removable memory medium, in a data storage of the printing apparatus;

attempting to delete the print data stored in the removable memory medium;

deleting the print data stored in the data storage, without printing the print data, if attempting to delete the print data stored in the removable memory medium has failed; and after the print data has been deleted from the removable memory medium, printing the specified number of copies of the print data based on the print data stored in the data storage of the printing apparatus and the specified number read out from the removable memory medium, and deleting the print data stored in the data storage after completion of printing.

11. The non-transitory computer usable medium according to claim 10, where the steps further include determining whether the attempt to delete the print data stored in the removable memory medium was successful.

12. A method to control a printing apparatus to print images on sheets of paper according to print data stored in a removable memory medium, comprising executing steps of:

reading out the print data and a specified number of copies, from the removable memory medium connected to the printing apparatus;

storing the print data, read out from the removable memory medium, in a data storage of the printing apparatus;

attempting to delete the print data stored in the removable memory medium;

deleting the print data stored in the data storage, without printing the print data, if attempting to delete the print data stored in the removable memory medium has failed; and after the print data has been deleted from the removable memory medium, printing the specified number of copies of the print data based on the print data stored in the data storage of the printing apparatus and the specified number read out from the removable memory medium, and deleting the print data stored in the data storage after completion of printing.

13. The method according to claim 12, further executing the steps of determining whether the attempt to delete the print data stored in the removable memory medium was successful.

14. The method according to claim 12, further executing the step of causing the print data stored in the removable memory medium to be inaccessible when the specified number reaches a maximum printable number of sheets.

15. The method according to claim 14, further executing the step of deleting the print data stored in the removable memory medium when the specified number reaches the maximum printable number of sheets.

16. The method according to claim 15, further executing the step of printing the images when the print data stored in the removable memory medium succeeds in being deleted therefrom before the specified number reaches the maximum printable number.

* * * * *